B. F. AUGUSTINE.
ROTARY GAS ENGINE.
APPLICATION FILED AUG. 15, 1917.

1,382,611.

Patented June 28, 1921.
5 SHEETS—SHEET 1.

Fig. 1.

Inventor
Benjamin F. Augustine

Attorney

B. F. AUGUSTINE.
ROTARY GAS ENGINE.
APPLICATION FILED AUG. 15, 1917.

1,382,611.

Patented June 28, 1921.
5 SHEETS—SHEET 3.

B. F. AUGUSTINE.
ROTARY GAS ENGINE.
APPLICATION FILED AUG. 15, 1917.

1,382,611.

Patented June 28, 1921.
5 SHEETS—SHEET 5.

UNITED STATES PATENT OFFICE.

BENJAMIN F. AUGUSTINE, OF BUFFALO, NEW YORK.

ROTARY GAS-ENGINE.

1,382,611.　　　　　　Specification of Letters Patent.　　Patented June 28, 1921.

Application filed August 15, 1917. Serial No. 186,415.

*To all whom it may concern:*

Be it known that I, BENJAMIN F. AUGUSTINE, a citizen of the United States, residing at Buffalo, in the county of Erie and State of New York, have invented certain new and useful Improvements in Rotary Gas-Engines, of which the following is a specification.

The invention relates to new and useful improvements in a gas engine and more particularly to a gas engine of the two cycle type.

An object of the invention is to provide a gas engine of the above type with means whereby air is introduced into the cylinder in the region of the intake ports for scavenging the cylinder; the exhaust ports being arranged at a distance from the region at which the air is admitted.

Another object of the invention is to provide an engine of the above character with means for admitting a dry explosive gas to the cylinder after the admission of a portion of the air and with the remainder of the air and in such manner as to thoroughly mix the gas and air.

A still further object of the invention is to provide an engine of the above character wherein the air for scavenging the cylinders is drawn into the crank case of the engine where it may be utilized for absorbing heat from the inner heated parts of the engine which heat is used for power purposes in the cylinders, and which also results in the cooling of the shaft and bearings.

A further object of the invention is to provide a gas engine of the rotary type having cylinders arranged in connected pairs with means for permitting the exhaust gases to escape from one cylinder of a pair and with means for admitting air to the other cylinder of the pair for scavenging the cylinders and also with means for permitting the admission of dry fuel gas after the admission of a portion of the air and at the region of the air intake ports whereby the air and gas are thoroughly mixed; the admission of the gas, the air and the escape of the gases all being controlled by the pistons.

Another object of the invention is to provide an engine of the above character wherein air is utilized in scavenging the cylinders, with a pumping means for supplying the air to the crank casing, or storage receptacle therefor under slight compression, and also with a pumping means for providing a supply of cold fuel to a fuel supply chamber.

These and other objects will in part be obvious, and will in part be hereinafter more fully disclosed.

In the drawings, which show by way of illustration one embodiment of the invention.

Fig. 2ª is a detail in section showing the connection of the exhaust pipe to the chamber receiving the exhaust gases.

The invention broadly consists in a gas engine having a plurality of cylinders each of which is provided with a piston. Intake ports are provided in the walls of the cylinders, which intake ports are controlled and uncovered by the piston. These intake ports permit a dry gas to enter the cylinders from a fuel supply chamber. Exhaust ports are provided in the walls of the cylinder which are controlled or uncovered by the piston and the exhaust gases from the exhaust ports are led to a chamber wholly or partially surrounding the fuel supply chamber so that the outer wall of the fuel supply chamber is heated and may be utilized for thoroughly gasifying the fuel which is delivered to the intake ports. Adjacent the fuel intake ports is a series of air intake ports likewise controlled or uncovered by the pistons. These air intake ports are so disposed relative to the fuel intake ports as to permit air to enter first and at least begin the scavenging of the cylinders so as to force the burnt gases away from the head of the piston before the fuel gases are admitted. Air is supplied to these air intake parts from the crank casing where the air is utilized for absorbing heat from the inner heated parts of the engine which also results in cooling the shaft and its bearings and also the inner parts of the pistons and cylinder walls. Pumps are utilized for supplying the gas to the fuel supply chamber and for also supplying air to the crank casing.

Referring more in detail to the drawings my improved gas engine consists of a rotating casing 1 which is mounted to rotate about a fixed shaft 2. The fixed shaft 2 is mounted in suitable bearings. Mounted in the casing is a plurality of pairs of cylinders, each pair including a cylinder 3 and a cylinder 4. The outer ends of these cylinders are connected by a cap plate 5 which is provided with a passage connecting the combustion chambers of the respective cylinders. Each cylinder 3 is provided with a piston 6 having a piston rod 7 connected to a crank on the fixed shaft 2. Each cylinder 4 is provided with a piston 8 having a piston rod 9 also connected to this same crank. The cylinders being connected, the pistons operate in multiple, that is, both pistons are subjected simultaneously to the expanding gases.

The above parts and many of the other parts of my engine are similar in construction with those shown in my prior Patent 1,229,569, granted June 12, 1917, on which the present invention is an improvement and therefore only a general reference will be necessary to these parts which are described more in detail in said patent.

Located within the casing is a cylindrical partition 10 through which the cylinders extend and also a second partition 11 which is disposed outside of the first partition and spaced therefrom so as to form a fuel supply chamber 12. The fuel from the fuel supply chamber is led to the cylinders 3 through intake ports 13. There is a passage 14 formed in the casing which connects these intake ports with the fuel supply chamber 12. This passage is clearly indicated in Fig. 2 of the drawings. Between the partition 11 and the outer wall of the casing, is a chamber 14' which receives the exhaust gases from the exhaust port 15 in the cylinder 4. It will be noted that the intake ports and also the exhaust ports are controlled by the pistons 6 and 8, respectively. These pistons of course have no radial movement relative to the fixed shaft, to which they are attached. It is the cylinders which move outwardly that cause the casing to rotate. This relative movement between the cylinder and the piston causes the piston however to uncover these ports to permit the exhaust gases to escape and the fresh fuel gases to rush into the cylinder.

Figure 1:
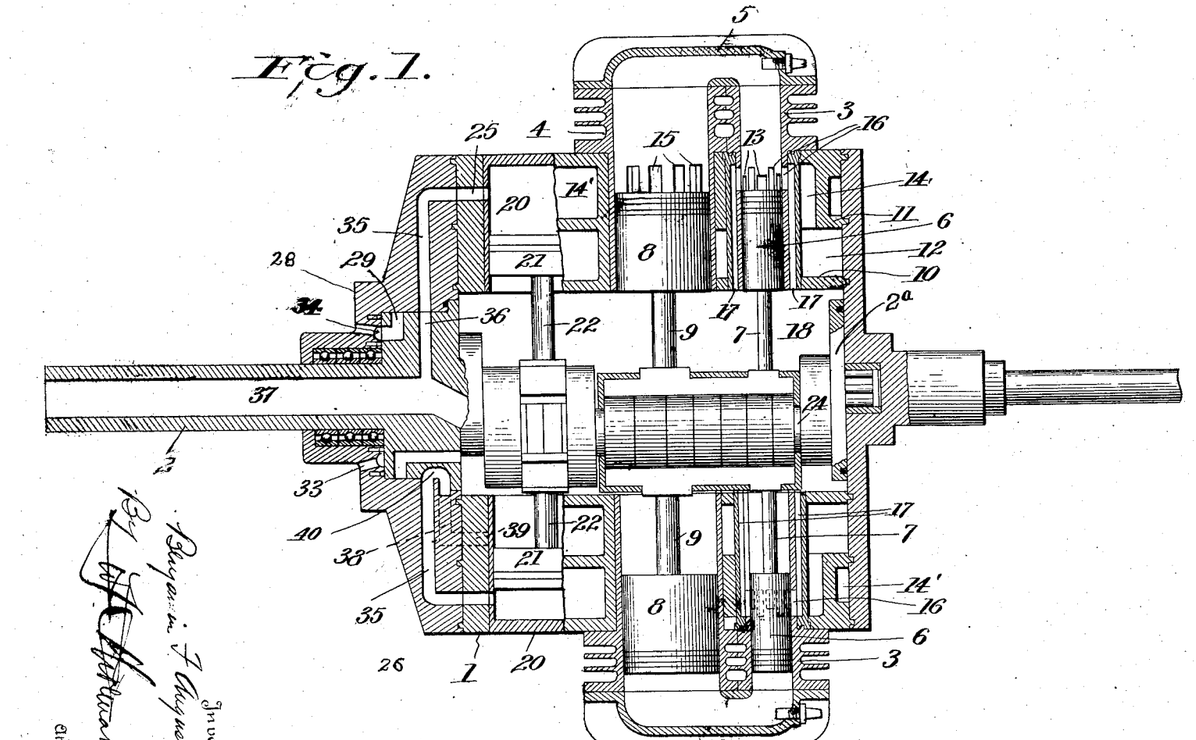
Figure 1 is a view partly diagrammatic showing a section through the opposed cylinders of the engine and a section through two of the pumps, which deliver the fuel gas; the bonnet and tubes for the exhaust gases being omitted.

Disposed between the intake ports 13 are air intake ports 16 (see Fig. 1). These air intake ports are connected with passages 17 which extend downwardly and connect with the chamber 18, which is generally referred to as the crank casing of the engine.

It will be noted that the air intake ports are slightly longer than the fuel intake ports and these air intake ports are slightly shorter than the exhaust ports. The result of this proportioning of the ports is that the exhaust ports are the first to be uncovered to release the exhaust gases and substantially with the uncovering of these ports the air intake ports are uncovered which permits air to rush into the smaller cylinder forcing the burnt gases over into the larger cylinder and out through the exhaust ports. Shortly after the air intake ports are uncovered and after the burnt gases have been displaced from in and about the head of the pistons, then the rich dry fuel gas is admitted through the fuel intake ports, and this dry explosive gas will mix with the air which continues to enter through the air intake ports and permeate the entire mass of the air which has completely scavenged the cylinders and the explosion of the fuel gas heating th air expanding the same, creates a working force for the engine.

Figures 2, 2A:
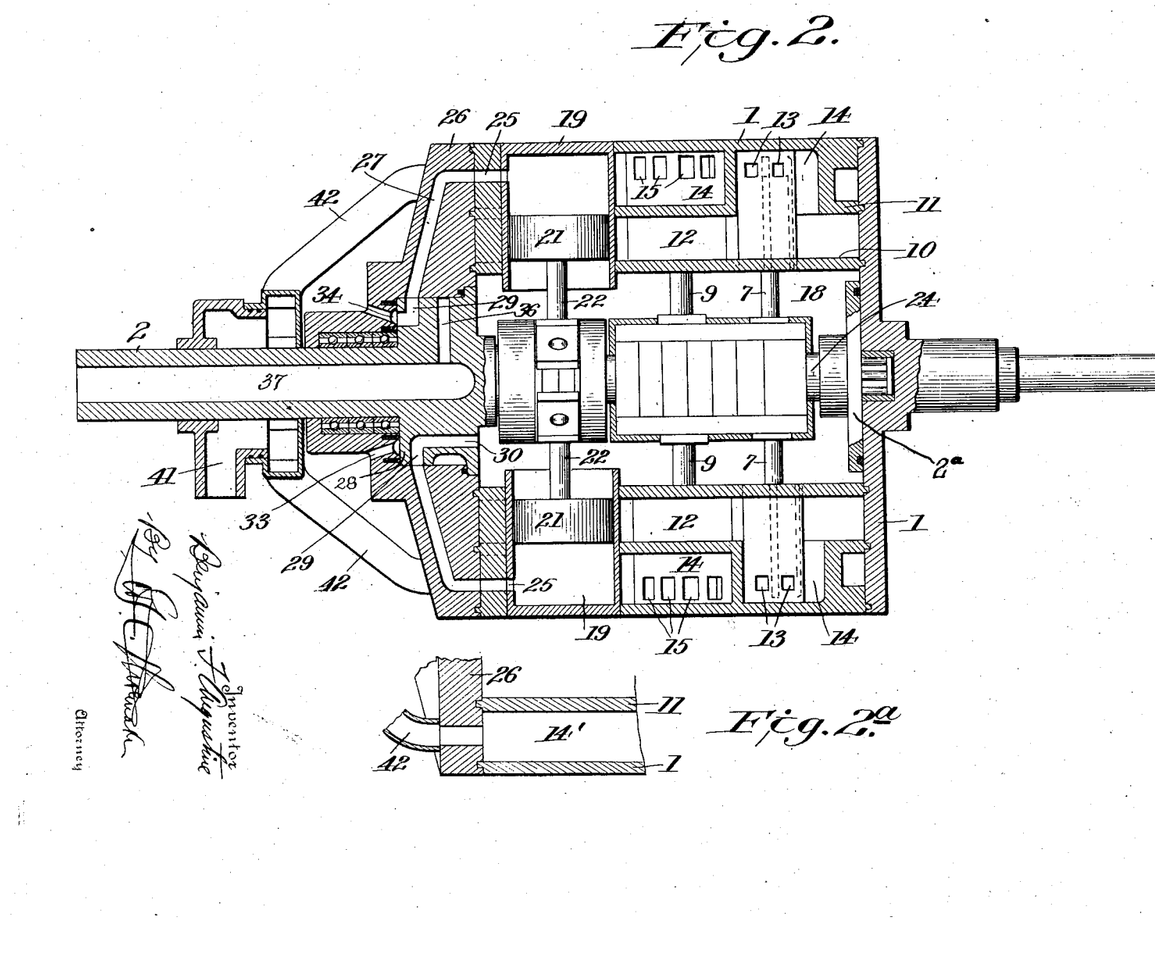
Fig. 2 is a similar view showing a section between the cylinders and a section through two of the pumps which operate to deliver air.
Figure 3:
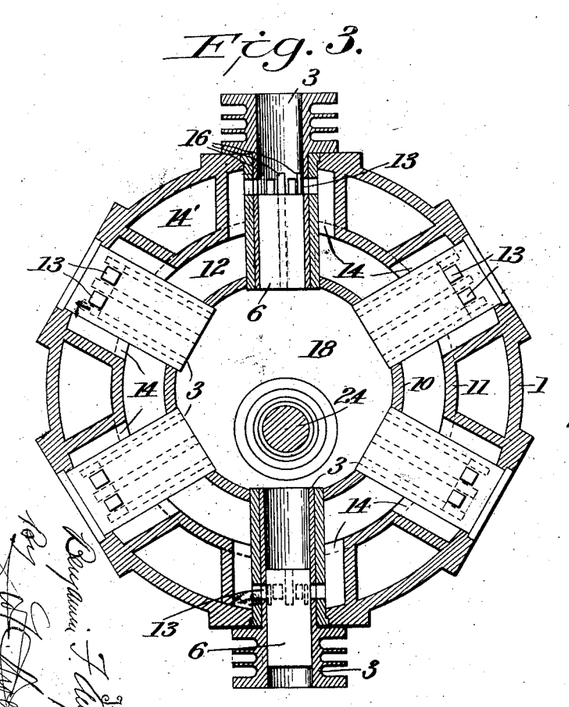
Fig. 3 is a transverse sectional view through the small cylinders.
Figure 4:
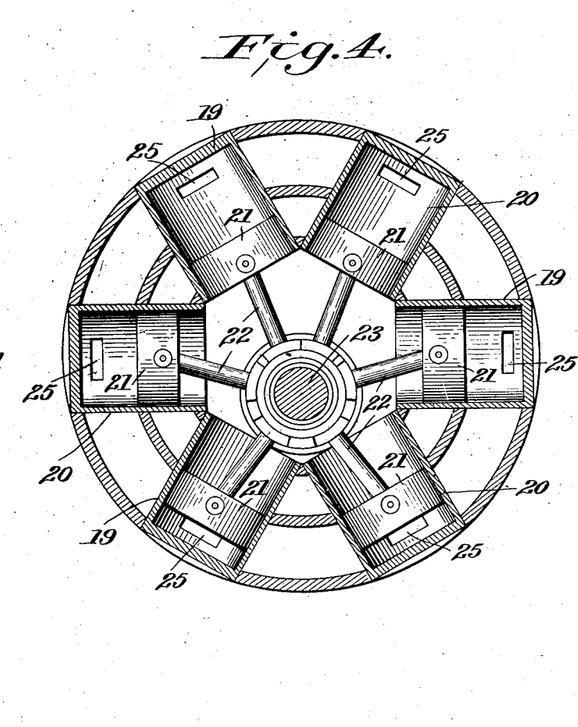
Fig. 4 is a transverse sectional view through the pumps.
Figure 5:
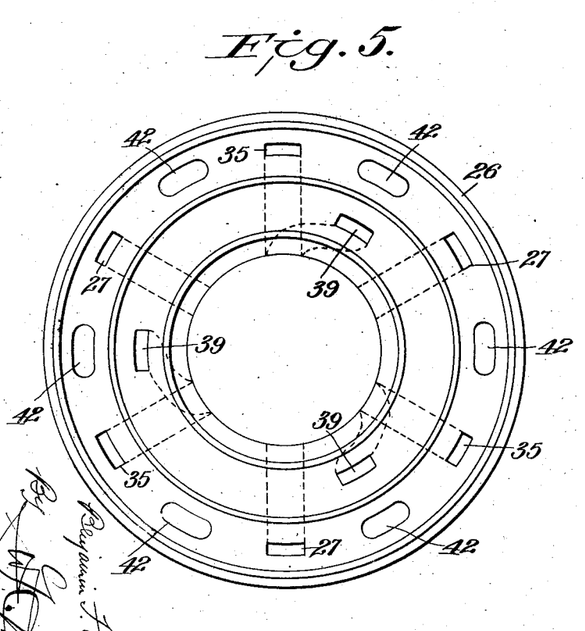
Fig. 5 is an end view of one of the ported heads.
Figure 6:
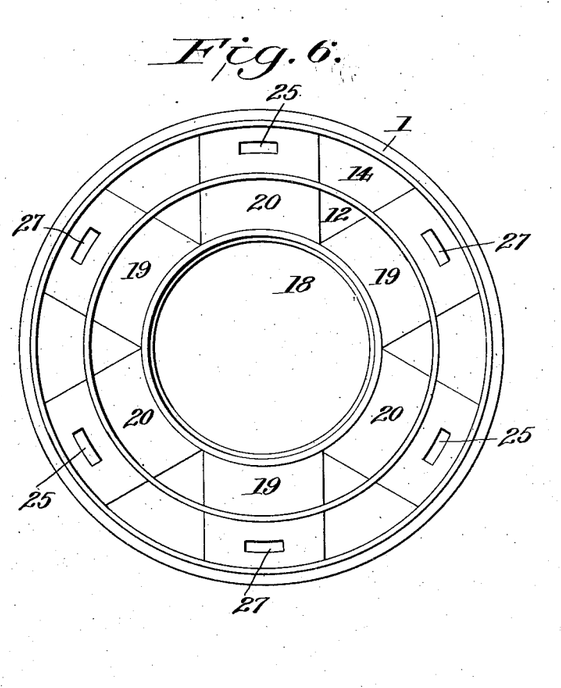
Fig. 6 is an end view of the engine casing.
Figure 7:
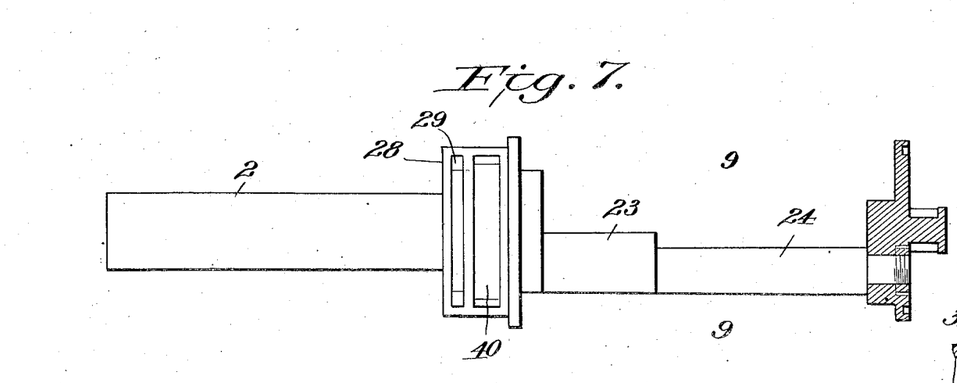
Fig. 7 is a side view of the shaft of the engine.

As clearly shown in Fig. 4 of the drawings, I have provided six pump cylinders, three of which are indicated at 19 and three are indicated at 20. In each pump cylinder is a piston 21 connected to a piston rod 22 and these piston rods are all connected to the fixed crank 23 which is slightly larger and eccentrically set relative to the fixed crank 24 engaged by the piston rods 7 and 9. This gives a relative shorter stroke to the pump pistons. The pump cylinders are of sufficient diameter, however, to handle the volume of air and gas required. Each pump cylinder is provided with a port 25. The pump cylinders 19 are used for pumping air while the pump cylinders 20 are used for pumping gas. In Fig. 2 of the drawings I have shown a section through the pump cylinders 19, it being understood that this figure of the drawings is diagrammatic to the extent that the pump cylinders are not directly opposed to each other. The end head 26, of the engine which serves to close one end of the engine casing is provided with passages 27 which register with ports 25 in the pump cylinders which operate to supply the air. The casing proper has a port or passage connecting these passages 25 and 27. Each passage 27 extends radially of the head 26. Said head is provided with a central opening adapted to receive the fixed shaft 2 and also with a chamber or recess adapted to receive the enlarged section 28 carried by the shaft 2 and which may be formed as a part of the shaft or as a separate member, and secured to the shaft, the essential feature being that this enlarged section shall be held from movement. This enlarged section 28 is provided with a segmental port 29 which is adapted to register with the passages 27. This segmental port is of sufficient length so as to be connected simultaneously to two of the pump cylinders, so that air may be delivered continuously into this port from the pump cylinder. This segmental port 29 extends radially into the extension and thence by a port 30 laterally of the extensions so as to open at the inner face thereof into the crank casing. It will thus be seen that the lowermost pump in Fig. 2 is free to deliver air through the port 25 and the passage 27 into the segmental port 29 and thence through the lateral port 30 into the crank casing.

Figure 8:
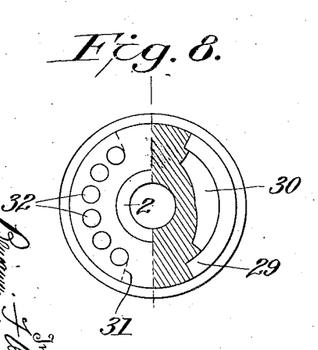
Fig. 8 is a view showing partly in elevation the ported enlargement on the main shaft.
Figure 9:
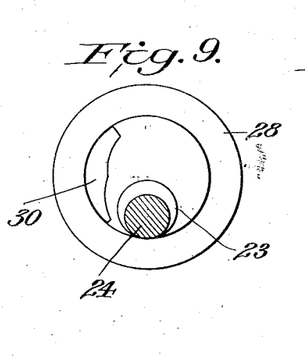
Fig. 9 is a transverse sectional view through the shaft and the enlargement thereon.
Figure 10:
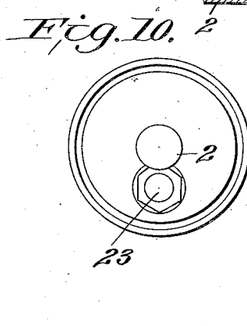
Fig. 10 is an end view of the shaft.
Figure 11:
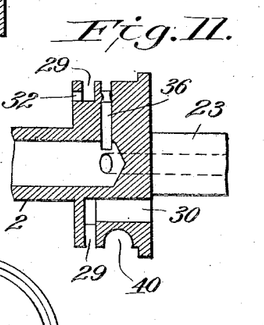
Fig. 11 is a view longitudinally of the shaft and the enlargement formed thereon.

On the opposite side of the extension 28 from the segmental port 29 there is a second segmental port indicated in dotted lines in Fig. 8 at 31. The extension 28 is provided with a series of ports 32 which extend from the outer face of the sections into this port 31. The port 31 is adapted to register with the passages 27 and is of such length that two of the passages 27 may be simultaneously connected therewith. It will readily be seen that by this arrangement the pumps will be taking in air and delivering the same continuously to the crank casing, placing the crank casing under slight compression. The end head 26 of the casing is provided with a series of openings 33 which extend from the outer face of the head to a chamber 34. This chamber is annular and the ports 32 are continuously in register therewith. This arrangement permits cold air to be drawn in by the pumps; and delivered to the crank casing; and this cold air in the crank casing surrounds the shaft and bearings, the inner parts of the cylinder walls, and the pistons, absorbing heat from these parts and cooling the same; at the same time the air in the crank casing is put under slight compression. When the air intake ports are uncovered by the pistons, the air will rush into the cylinders to completely scavenge the same, as above noted.

While the air in the crank casing absorbs heat from the inner parts of the engine, it enters the cylinders more or less cool so that a large volume of air may be taken in quickly while the air intake ports are uncovered.

The three pump cylinders indicated at 20 are utilized for supplying fuel to the fuel supply chamber. The head 26 of the casing is provided with a plurality of passages 35 one for each port 25 of the pump cylinders 20. This passage 35 extends laterally and is connected by a suitable passage in the casing with the port 25 of the pump cylinder. It also extends radially to the recess, which receives the enlarged section 28 of the main shaft. This enlarged section of the main shaft has a segmental port 36 which extends through to the center of the shaft and connects with the chamber 37 which is adapted to receive the supply of fuel. When the passage 35 is in register with this segmental port 36, then the fuel gas is drawn through the passage 35 into the pump cylinder. This segmental port 36 is sufficiently long, so as to connect with two of the passages 35 at the same time. That is, it makes connection with one passage before it breaks connection with the other, so that fuel is being drawn in continuously by the combined action of the three pumps.

The head 26 is also provided with a radial passage 38 and a lateral passage 39 which connects with the supply chambers 12. The extension 28 is formed with a port 40 which is of sufficient width to connect the passages 35 and 38 when in register therewith, so that the fuel delivered from the pump cylinder into the passage 35 may pass into the port 40 then in the passage 38 and then to the fuel supply chamber. The length of port 40 is such that one of the pump cylinders is always supplying fuel to the fuel supply chamber. That is to say, before one cylinder which is delivering a supply of fuel entirely leaves the port 40 another cylinder is connected therewith, and begins to furnish a supply of fuel. It will be understood however, that there is a period of cut off between the fuel receiving port in the extension 28 and the fuel discharge port which is of greater extent than the diameter of the passage 35 so as to prevent any backward escape of the gases from the fuel supply chamber. It will also be understood that the length of the ports both for the intake and discharge is sufficient so as to prevent any vacuum or any compression being formed in the pump cylinders.

While I have described an arrangement of pumps wherein a certain number of the pumps operate to deliver air and wherein a certain number operate to deliver the fuel supply, it will be understood of course, that this pumping means may be modified in various ways to suit the capacity of the cylinders.

From the above description it will be noted that the exhaust gases are received into the chamber 14' and these exhaust gases pass out from the chamber 14' into a bonnet 41. This bonnet may be connected in any suitable way with the chamber 14' which receives the exhaust gases. In the present embodiment of the invention it is connected through the series of tubes 42.

The air in the crank casing is under slight compression. In order to balance the forces due thereto I have provided a balance plate 2ª which is secured to the end of the shaft 2. This balance plate has an air tight connection with the end head of the casing. The diameter of this balance plate is the same as the inner face of the enlargement or extension 28 and, therefore, the forces against one end head of the casing will be perfectly balanced by the forces against the other end head.

The operation of my improved gas engine will be obvious from the above description, the casing carrying the cylinders rotates about a fixed shaft. Three of the pumps operate to draw in air which is forced into the crank casing where the air is placed under slight compression from the pumps, and by further compression due to the heat of the engine parts, which is absorbed by the air thus keeping the parts of the engine cool and transferring this heat energy into power.

As the cylinders reach a certain point in the rotation of the engine the exhaust ports will be the first uncovered, relieving all pressure in the cylinders and substantially at the same time, that the exhaust ports are uncovered, but at an instant later, the air intake ports are uncovered by the piston in the other cylinder, and this permits the air which is under slight compression as above noted, to rush into the cylinder, forcing all the burnt gases away from the head of the piston, and out through the exhaust ports. The exhaust ports are of substantially the same cross sectional area as the cross section of the cylinder containing the same so that when these exhaust ports are fully open there is a free unobstructed passage to permit the escape of the exhaust gases. The air ports are sufficiently large to let in a volume of air to completely scavenge the cylinders. When a certain amount of air has entered the cylinder, then the fuel supply ports are uncovered, and a dry gasified fuel enters the cylinder thoroughly mixing with the air entering through the fuel intake ports and thoroughly permeating the same, thus not only completely scavenging the cylinders of the burnt gases but forming a uniform charge.

Owing to the fact that the fuel supply chamber is surrounded by the exhaust gases, the outer wall of this fuel supply chamber becomes heated. The centrifugal action holds the moist fuel against the heated wall and the same becomes thoroughly gasified. After the charge has been admitted to the cylinders, the relative movement between the cylinder and piston closes the ports, the charge is compressed and fired in the usual manner, of a two cycle engine. It will be understood, however, that from certain aspects my improved means for supplying air to scavenge the cylinder may be used in other types of engines.

What I claim is:—

1. A rotary gas engine including in combination an inclosed casing, a plurality of cylinders carried thereby, a piston for each cylinder, means for forming an air supply chamber centrally of the casing, said cylinders having air intake ports and passages communicating with said air supply chamber, an independent fuel supply chamber, means for supplying the fuel chamber with fuel, said cylinders having fuel intake ports and passages connecting the same with the fuel supply chamber, said air intake ports and said fuel intake ports being disposed in the same region and controlled by the pistons, said cylinders having exhaust ports located at a distance from said air intake ports, and means for controlling said exhaust ports.

2. A rotary gas engine including in combination an inclosed casing, a plurality of cylinders carried thereby, a piston for each cylinder, means for forming an air supply chamber centrally of the casing, said cylinders having air intake ports and passages communicating with said air supply chamber, an independent fuel supply chamber, means for supplying the fuel chamber with fuel, said cylinders having fuel intake ports and passages connecting the same with the fuel supply chamber, said air intake ports and said fuel intake ports being disposed in the same region and controlled by the pistons, said cylinders having exhaust ports located at a distance from said air intake ports, and means for controlling said exhaust ports, said air intake ports being disposed between the fuel intake ports and proportioned so as to admit air before the admission of fuel gases and also during the admission of the fuel gases.

3. A rotary gas engine including in combination an inclosed casing, a plurality of cylinders carried thereby, a piston for each cylinder, means for forming an air supply chamber centrally of the casing, said cylinders having air intake ports and passages communicating with said air supply chamber, an independent fuel supply chamber, means for supplying the fuel chamber with fuel, said cylinders having fuel intake ports and passages connecting the same with the fuel supply chamber, said cylinders having exhaust ports disposed at a distance from said air intake ports, said casing having a chamber surrounding the fuel supply chamber and adapted to receive the exhaust gases.

4. A rotary gas engine including in combination an inclosed casing, a plurality of cylinders carried thereby, a piston for each cylinder, means for forming an air supply chamber centrally of the casing, said cylinders having air intake ports and passages communicating with said air supply chamber, an independent fuel supply chamber, means for supplying the fuel chamber with fuel, said cylinders having fuel intake ports and passages connecting the same with the fuel supply chamber, said cylinders having exhaust ports disposed at a distance from said air intake ports, said casing having a chamber surrounding the fuel supply chamber and adapted to receive the exhaust gases, said air intake ports being disposed intermediate the fuel intake ports and so proportioned as to admit air before the admission of the fuel gases and also during the admission of the fuel gases.

5. A rotary gas engine including in combination, a casing, a plurality of pairs of cylinders mounted in said casing, a piston for each cylinder, the pistons in each pair of cylinders being arranged to operate in multiple and simultaneously, one of said cylinders in each pair having exhaust ports uncovered by the piston therefor, the other cylinder of each pair having fuel intake ports and air intake ports uncovered by the piston therefor, said air intake ports being connected to a chamber centrally of the casing and means for supplying the chamber with air, said intake ports being connected to an independent fuel supply chamber formed in said casing and surrounding the air chamber, and means for supplying said fuel chamber with fuel.

6. A rotary gas engine including in combination a casing, a plurality of pairs of cylinders mounted in said casing, a piston for each cylinder, the pistons in each pair of cylinders being arranged to operate in multiple and simultaneously, one of said cylinders in each pair having exhaust ports uncovered by the piston therefor, the other cylinder of each pair having fuel intake ports and air intake ports uncovered by the piston therefor, the air intake ports being disposed intermediate the fuel intake ports and so proportioned as to admit air prior to the admission of the fuel gases and also during the admission of the fuel gases, said air intake ports being connected to a chamber centrally of the chamber and means for supplying the casing with air, said intake ports being connected to an independent fuel supply chamber formed in said casing and surrounding the air chamber and means for supplying said fuel chamber with fuel.

7. A rotary gas engine including in combination a stationary shaft, a casing mounted to rotate about said stationary shaft, said shaft having a crank formed therein located within the casing, a plurality of radially disposed cylinders carried by the casing, a piston in each cylinder, a pitman connecting each piston with the crank, said cylinders having fuel intake ports and independent air intake ports uncovered by the piston, said casing having spaced cylindrical partitions forming an air chamber about the crank in the shaft, and a fuel supply chamber outside of said first named chamber, said casing having passages connecting the air chamber with the air intake ports and passages connecting the fuel chamber with the fuel intake ports and exhaust ports disposed at a distance from the air intake ports, and means for partly uncovering the same prior to the uncovering of the air intake ports.

8. A rotary gas engine including in combination a stationary shaft, a casing mounted to rotate about said stationary shaft, said shaft having a crank formed therein located within the casing, a plurality of radially disposed cylinders carried by the casing, a piston in each cylinder, a pitman connecting each piston with the crank, said cylinders having fuel intake ports and independent air intake ports uncovered by the piston said casing having spaced cylindrical partitions forming an air chamber about the crank in the shaft, and a fuel supply chamber outside of said first named chamber, said casing having passages connecting the air chamber with the air intake ports and passages connecting the fuel chamber with the fuel intake ports and exhaust ports disposed at a distance from the air intake ports, and means for partly uncovering the same prior to the uncovering of the air intake ports, and means for supplying air to the air chamber.

9. A rotary gas engine including in combination a stationary shaft, a casing mounted to rotate about said stationary shaft, said shaft having a crank formed therein located within the casing, a plurality of radially disposed cylinders carried by the casing, a piston in each cylinder, a pitman connecting each piston with the crank, said cylinders having fuel intake ports and independent air intake ports uncovered by the piston, said casing having spaced cylindrical partitions forming an air chamber about the crank in the shaft, and a fuel supply chamber outside of said first named chamber, said casing having passages connecting the air chamber with the air intake ports and passages connecting the fuel chamber with the fuel intake ports and exhaust ports disposed at a distance from the air intake ports, and means for partly uncovering the same prior to the uncovering of the air intake ports, means for supplying fuel to the fuel chamber, and means for supplying air to the air chamber.

10. A rotary gas engine including in combination a stationary shaft, a casing mounted to rotate about said stationary shaft, said shaft having a crank formed therein located within the casing, a plurality of radially disposed cylinders carried by the casing, a piston in each cylinder, a pitman connecting each piston with the crank, said cylinders having fuel intake ports and independent air intake ports uncovered by the piston, said casing having spaced cylindrical partitions forming an air chamber about the crank in the shaft, and a fuel supply chamber outside of said first named chamber, said casing having passages connecting the air chamber with the air intake ports and passages connecting the fuel chamber with the fuel intake ports and exhaust ports disposed at a distance from the air intake ports, and means for partly uncovering the same prior to the uncovering of the air intake ports, the air intake ports being arranged between the fuel intake ports and so proportioned as to supply air prior to and during the admission of the fuel.

11. A rotary gas engine including in combination a stationary shaft, a casing mounted to rotate about said stationary shaft, said shaft having a crank formed therein located within the casing, a plurality of radially disposed cylinders carried by the casing, a piston in each cylinder, a pitman connecting each piston with the crank, said cylinders having fuel intake ports and independent air intake ports uncovered by the piston, said casing having spaced cylindrical partitions forming an air chamber about the crank in the shaft, and a fuel supply chamber outside of said first named chamber, said casing having passages connecting the air chamber with the air intake ports and passages connecting the fuel chamber with the fuel intake ports and exhaust ports disposed at a distance from the air intake ports, and means for partly uncovering the same prior to the uncovering of the air intake ports, the air intake ports being arranged between the fuel intake ports and so proportioned as to supply air prior to and during the admission of the fuel, means for supplying air to the air chamber, and means for supplying fuel to the fuel chamber.

12. A rotary gas engine including in combination a stationary shaft, a casing mounted to rotate about said stationary shaft, said shaft having a crank formed therein located within the casing, a plurality of radially disposed cylinders carried by the casing, a piston in each cylinder, a pitman connecting each piston with the crank, said cylinders having fuel intake ports and independent air intake ports uncovered by the piston, said casing having spaced cylindrical partitions forming an air chamber about the crank in the shaft, and a fuel supply chamber outside of said first named chamber, said casing having passages connecting the air chamber with the air intake ports and passages connecting the fuel chamber with the fuel intake ports and exhaust ports disposed at a distance from the air intake ports, means for partly uncovering the same prior to the uncovering of the air intake ports, the air intake ports being arranged between the fuel intake ports and so proportioned as to supply air prior to and during the admission of the fuel, means for supplying air to the air chamber, means for supplying fuel to the fuel chamber, said casing having a chamber located outside said fuel chamber and surrounding the same, and means whereby the exhaust gases are delivered to said last named chamber.

13. A rotary gas engine including in combination a fixed shaft having a crank therein, a casing mounted to rotate about said shaft, a plurality of radially disposed cylinders carried by the shaft, said casing having heads for inclosing the same, said shaft carrying an enlarged ported section located within one of said heads and a balance plate secured to the other end of the shaft and having an air tight connection with the opposite head, said balance plate being of the same diameter as the enlarged section in the shaft whereby the chamber about the crank is adapted to receive air under pressure, and the force of the air against one head balanced by the force of the air against the other head.

In testimony whereof I affix my signature.

BENJAMIN F. AUGUSTINE.